United States Patent [19]

Boxall

[11] 3,708,624

[45] Jan. 2, 1973

[54] PULSE CODE MODULATION COMMUNICATION SYSTEM

[75] Inventor: Frank S. Boxall, Menlo Park, Calif.

[73] Assignee: Vicom Corporation, Mountain View, Calif.

[22] Filed: April 24, 1969

[21] Appl. No.: 853,990

Related U.S. Application Data

[63] Continuation of Ser. No. 503,395, Oct. 23, 1965, abandoned.

[52] U.S. Cl. ............................179/15 A, 172/15 AV

[51] Int. Cl. ................................................H04j 3/04

[56] References Cited

UNITED STATES PATENTS

| | | | |
|---|---|---|---|
| 2,957,949 | 10/1960 | James | 179/15 A |
| 3,193,803 | 7/1965 | Hoffman | 179/15 A X |

*Primary Examiner*—Ralph D. Blakeslee
*Attorney*—Flehr, Hohbach, Test, Albritton & Herbert

[57] ABSTRACT

A multi-channel pulse code modulation system in which the amplitude of a waveform is sampled, compressed and allowed to settle and thereafter the compressed sample is sampled and held and thereafter encoded.

10 Claims, 11 Drawing Figures

INVENTOR.
FRANK S. BOXALL

BY

Flehr and Swain
ATTORNEYS

INVENTOR
FRANK S. BOXALL
BY
Flehr and Swain
ATTORNEYS

INVENTOR.
FRANK S. BOXALL
BY
Flehr and Swain
ATTORNEYS

INVENTOR
FRANK S. BOXALL
BY
Flehr and Swain
ATTORNEYS

INVENTOR.
FRANK S. BOXALL
BY
Flehr and Swain
ATTORNEYS

INVENTOR
FRANK S. BOXALL
BY
ATTORNEYS

INVENTOR.
FRANK S. BOXALL
BY
Flehr and Swain
ATTORNEYS

INVENTOR
FRANK S. BOXALL
BY
Flehr and Swain
ATTORNEYS

PULSE CODE MODULATION COMMUNICATION SYSTEM

This application is a continuation of Ser. No. 503,395, filed Oct. 23, 1965, now abandoned.

This invention relates to a pulse code modulation (PCM) communication system and to such a system in which analog signals are processed to give pulse groups which are transmitted, usually in time division multiplex, received and processed to reconstitute the analog signal. More specifically, the invention relates to such a communication system which employs sample and hold processing.

PCM exchange carrier systems are known. In these systems, the message to be transmitted is periodically sampled to provide pulses whose amplitude is proportional to the signal level at the instant of sampling. The pulse amplitude is then quantized and encoded, that is, the amplitude is approximated by one of a number of discrete values called quantum levels. The pulse amplitude can only be approximated to within one-half quantum step. The difference between the actual amplitude and the nearest quantum level is so-called quantizing noise. At higher signal amplitudes, the quantizing noise is not objectionable because it represents only a small fraction of the signal amplitude; but at lower signal amplitude, the signal to noise ratio becomes relatively small and quantizing noise becomes objectionable. To ameliorate the quantizing noise, the pulses having the signal amplitude are non-linearly compressed whereby the lower signal levels receive preferential gain so that they occupy a greater percentage of the amplitude range. The quantum level corresponding to the pulse amplitude is converted to PCM pulse groups which are transmitted. At the receiving end these PCM pulse groups are decoded, translated back into a pulse having the amplitude corresponding to the original pulse, expanded, and then filtered to give the original message.

More than one message may be transmitted at one time by time division multiplexing techniques. A plurality of message channels are sequentially and repeatedly sampled and serially transmitted. At the transmitter, trains of pulses are used for timing both the sampling and encoding of the message and the sequential assignment of the common transmission medium. At the receiving end of the multiplex system, timing pulses are employed to distribute the signals to a plurality of output channels. In order to distribute the messages properly, the PCM receiver must operate in phase or frame with the transmitter. To effect framing between the transmitter and receiver, it is known to transmit, in addition to pulse coded samples, framing information in the form of an additional digit.

In one particular pulse code transmission system, the incoming messages (speech) or analog information is sampled 8,000 times per second by a sampling gate associated with each message channel. The resultant sample, which is in the form of a pulse whose amplitude is proportional to the signal level at the instant of sampling (pulse amplitude modulated, PAM) is passed through a compressor, which gives preferential gain to the low level signals, and is presented to a coder. The coder expresses the sample amplitude as a seven digit binary number having one of 128 different possible signal levels. The first digit has the weight of 64, and the last digit has a weight of one. The seven digit code goes onto the transmission line followed by an eigth time slot which carries supervisory signals. 24 channels may be sampled in a recurring sequence, one sample from each channel being coded and transmitted every 125 microseconds. Since each sample requires eight time slots including the signalling pulse, these 24 samples require a total of 192 time slots on the line. An additional or 193rd time slot is added to permit synchronization or framing of the two ends of the system. These 193 time slots comprise a framing period. The repetition rate of pulses on a line is 1.544 million pulses per second, and the time assigned to one bit is 0.65 microseconds. The pulses are selected to have a duty cycle of 50 percent and are, therefore, 0.325 microseconds wide.

These pulses, containing message, signalling and framing information, arrive at the receiving terminal after they have been reconstituted several times by regenerative repeaters spaced at predetermined intervals. At the receiver, the pulses are sorted out, the signalling pulses being directed to the individual channel signalling units and the coded message pulses going into a decoder. The decoder output pulses have the same amplitude modulation as the pulse input to the coder within one-half quantum step. The decoded (PAM) pulse passes through the expander, which has the inverse characteristics of the compressor, providing more gain for higher level signals. The expander is followed by wide band amplifier which raises the signal level before being switched to the channel units.

In the prior art, so-called "energy sampling" is employed in sampling the signals in each of the channels. At the channel level, energy sampling requires balanced gates with high level transformer drive. At the common equipment level, energy sampling requires an erase interval between samples to avoid inter-channel cross-talk. The time necessary for adequate erasure and new sample build-up leads to a requirement for two compressors and two encoders plus transfer circuits to transfer the output of the two circuits onto a single transmission line so that one set can erase and build up, while the other is coding, and vice versa.

It is an object of the present invention to provide a PCM communication system including analog to digital conversion employing a two-step process for avoiding the economic penalties of "energy sampling."

It is another object of the present invention to provide a PCM communication system which employs serial decoding.

It is still a further object of the present invention to provide a PCM communication system including analog to digital conversion with employs a sample and hold process wherein while the channel is being sampled, the previous channel pulse is being coded.

It is a further object of the present invention to provide a PCM communication system which employs improved sampling and distribution gates.

It is a further object of the present invention to provide a system in which noise due to timing jitter in the receiver gate is eliminated.

The foregoing and other objects of the invention will become more clearly apparent from the following description when taken in conjunction with the accompanying drawing.

Referring to the drawing.

Figures 1, 11:
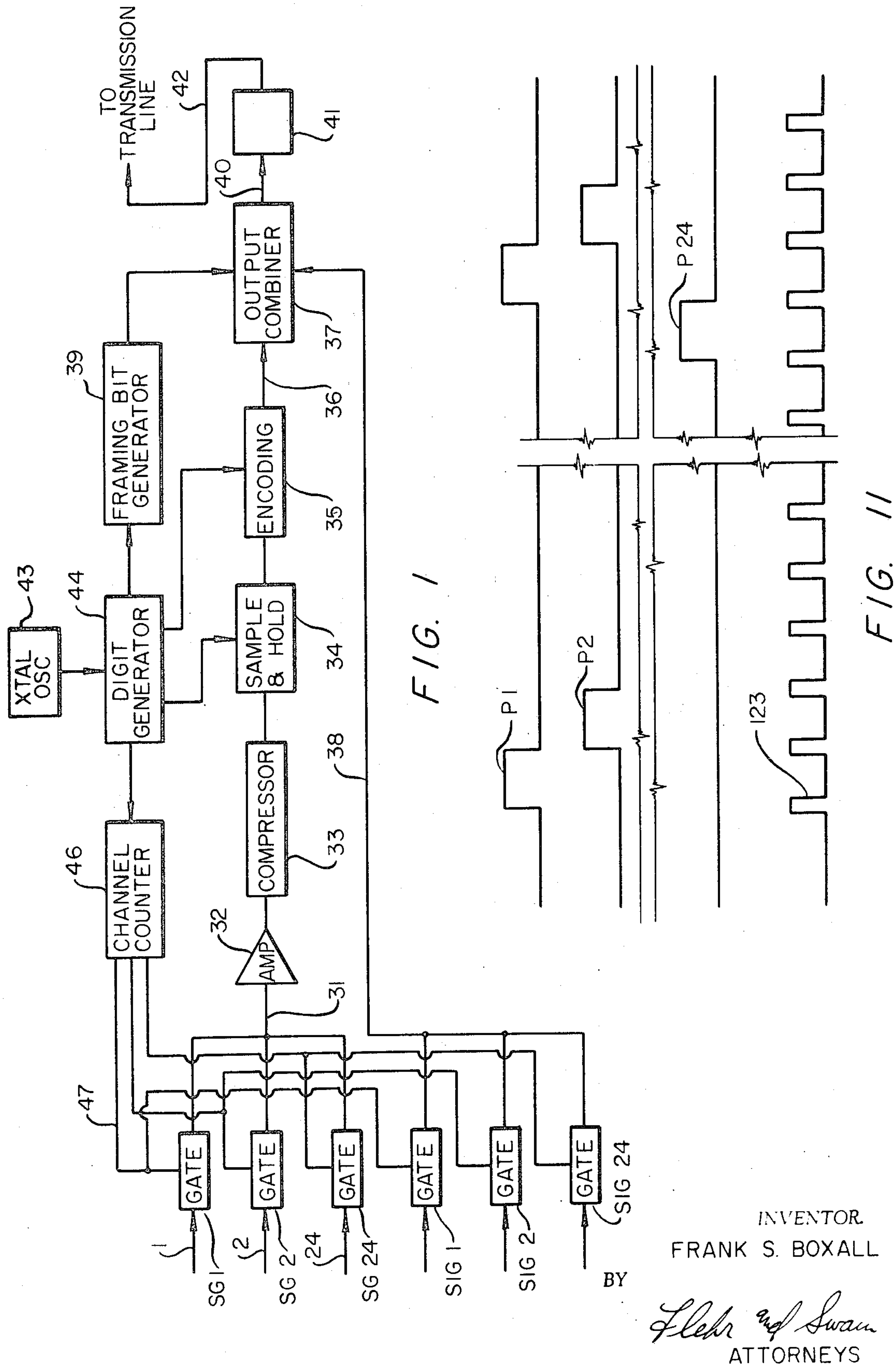
FIG. 1 is a schematic block diagram showing a system for processing a plurality of message channels to provide multiplex PCM signal transmission of messages.
FIG. 11 is a timing diagram showing the operation of the distribution gates.
Figure 2:
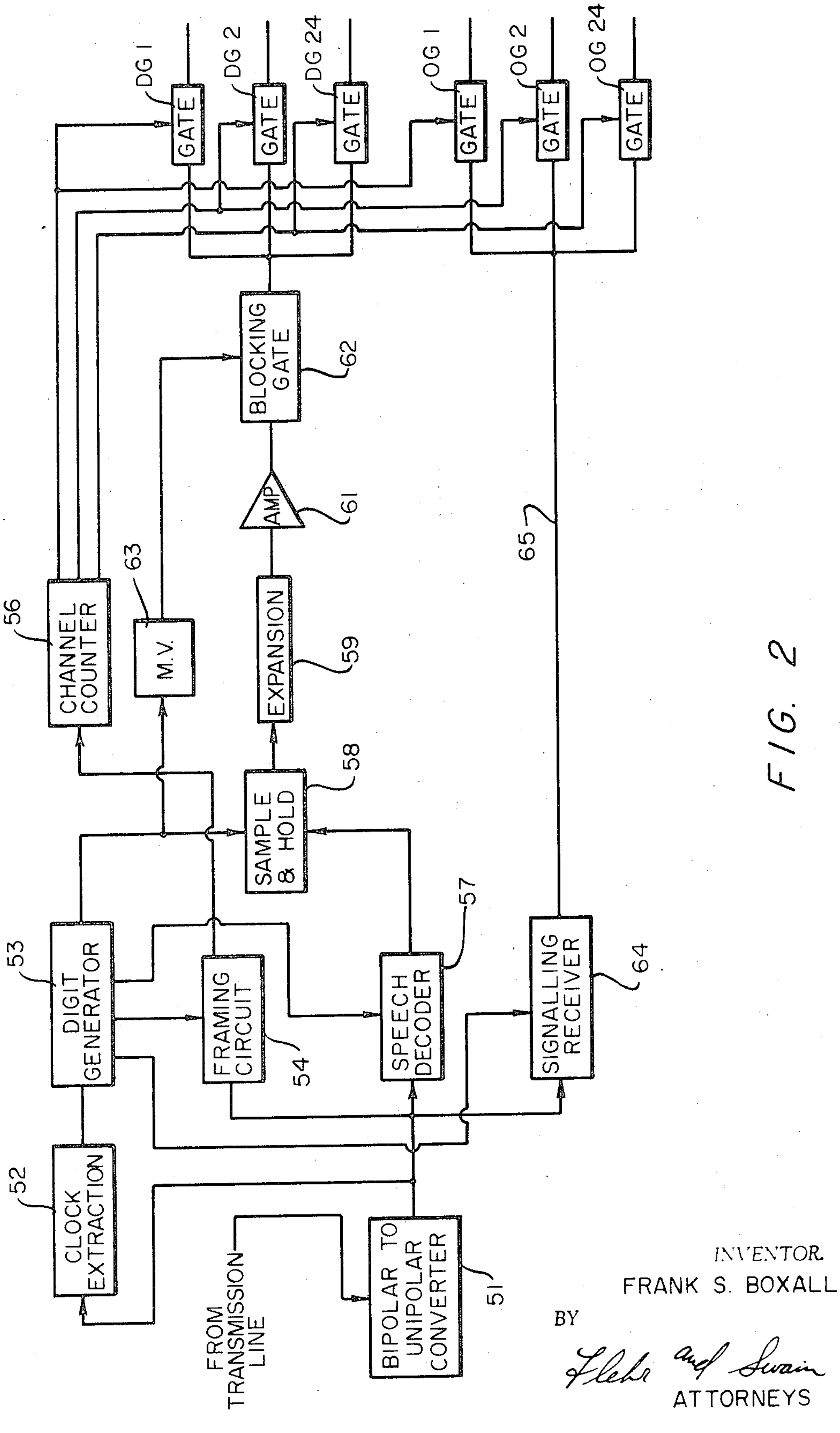
FIG. 2 is a schematic block diagram of a system for receiving and processing the transmitted multiplex PCM signal and distributing the messages.

Referring to FIG. 1, the analog signals from the message channels are indicated by arrows 1–24. These signals are applied to respective sampling gates SG–1 – SG–24. These gates, as previously described, serve to sample the signal on each of the lines 1–24 at a rate of 8,000 times per second and apply the pulse samples to the common output line 31. Thus, the signal at the line 31 is a time division multiplexed PAM signal. The amplitude of each pulse sample is proportional to the signal level at the instant of sampling. The multiplexed PAM signal is applied to a common amplifier 32. The amplified signal is compressed by compressor 33 and applied to sample and hold circuits 34. The output of the sample and hold circuit is encoded by an encoding circuit 35 and the pulse code modulated (PCM) speech appears on the line 36 and is applied to an output combiner 37. The gates SIG–1 – SIG.–24 are switched in unison with the gates SG–1 – SG–24 and provide a time division multiplex signal on the line 38 which is applied to the input combiner 37. A framing generator 39 applies framing pulses to the combiner. Thus, the input combiner serves to combine the PCM speech signal, the signalling pulses and the framing bits to provide a PCM signal on line 40 which is a multiplexed signal carrying speech, signalling and timing information. This information is applied to a unipolar to bipolar converter 41 and is then transmitted along transmission line 42 to associated repeaters and receiving terminals.

The sample and hold circuit 34, described above, samples every one of the sequence of incoming compressed channel pulses and holds the respective values for encoding by encoder 35. While the encoding of a particular sample is taking place, the succeeding sample is settling at the input preparatory to being sampled.

The encoder provides, at the line 36, a seven digit pulse code representative of the amplitude of the corresponding compressed PAM pulse. The pulse output on the line 40, in addition to the group of seven bits, contains an eight bit controlled by the supervisory channel pulse train on line 38 from the signalling channels and for each frame or group of 24 samples, a 193rd pulse time slot which accommodates a framing pulse from the framing bit generator 39.

The timing signals for the gates, the sample and hold circuit, the encoder, the output combiner, and the framing bit generator are generated by primary clock 43 which may be a crystal oscillator. The output from the crystal oscillator is applied to a digit generator 44 which drives a channel counter 46 having 24 output lines 47, one associated with each of the gates SG–10–SG–24 and SIG–1 – SIG–24 to control these gates to provide the time division multiplexed signals on the lines 31 and 38.

An output from the digit counter 44 is applied to the sample and hold circuit to control the sample and hold operation, as will be presently described in detail. A further output from the digit generator comprises seven lines for applying timing pulses to the encoder. A further output is applied to the framing bit generator 39 which generates the framing bit.

At the receiver, the signals are received by a bipolar to unipolar converter 51 which converts the signals to unipolar form. One output from the converter is applied to a clock extraction circuit 52 which extracts timing information and applies the same to a digit generator 53. The output from the converter 51 is also applied to a framing circuit 54 which extracts the framing information to control the channel counter 56 which provides 24 output signals to control distribution gates DG–1 – DG–24 and the output signalling gates OG–1 – OG–24.

The converter output is also applied to speech decoder 57 which decodes the PCM signal. The timing is controlled by seven timing pulses from the digit generator. The output of the decoder is then applied to a sample and hold circuit 58 which likewise has timing information applied thereto from the digit generator 53 and which, in conjunction with the decoder, provides linear decoding. The output from the sample and hold circuit 58 is applied to an expander 59. The expanded output is then amplified by an amplifier 61 and applied to the distributing gates DG–1 – DG–24 through a blocking gate 62 which assures that the time division multiplex PAM signal appearing at the output of the common amplifier is only applied to the distribution gates DG–1 – DG–24 after the gate is open.

A one-shot multivibrator 63 receiving timing information from the digit generator 53 serves to control the blocking gate so that the gate opens for a period of time which is less than the time that any one of the output gates is open whereby to prevent jitter as will be presently described in detail herein.

The signal from the converter is also applied to a signalling receiver 64 which receives timing information from the digit generator 53 and provides a time division multiplex signal on the line 65 for application to the output signal gates OG–1 – OG–24 which, in turn, serve to control the associated signalling circuits.

Figure 3:
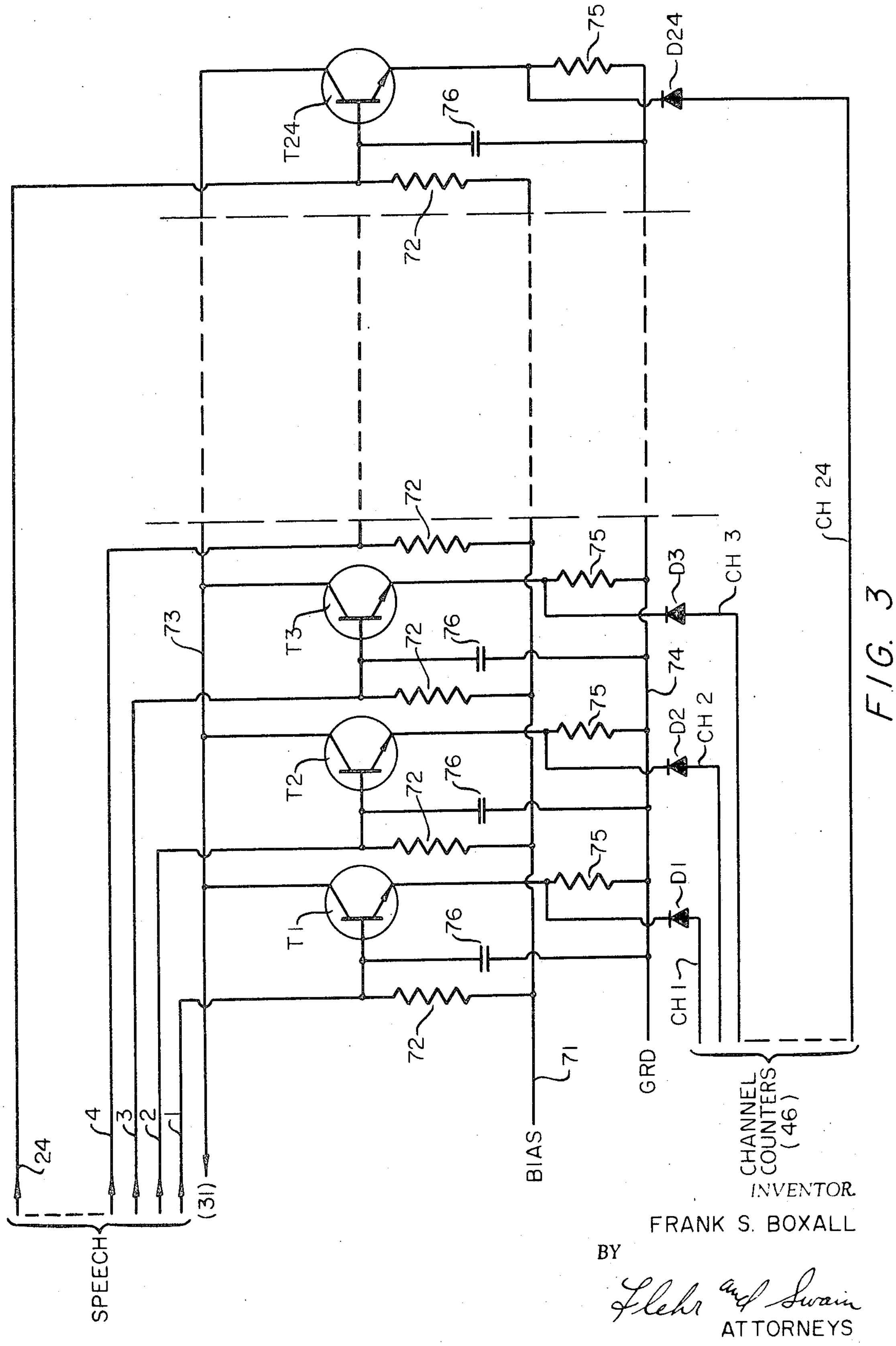
FIG. 3 is a detailed circuit diagram showing the channel sampling gates of FIG. 1.

A circuit diagram of the channel gates, SG–1 – SG–24, which serve to sequentially sample the channels 1 – 24 is shown in FIG. 3. The transistors T1 – T24 form the active elements for the gates SG–1 – SG–24. The bases of the transistors are connected to a regulated bias supply line 71 through identical resistors 72.

The base of each transistor receives the analog signal for the respective channel along the lines 1 – 24. The collectors of the transistors are connected to the common line 73. The emitters of the various transistors are connected to ground 74 through resistors 75. An input capacitor 76 is connected between the base of each of the transistors and ground 74. The transistors are gated on by channel pulses applied along the lines CH–1 – CH–24 from the channel counter 46 through diodes D1 – D24 to the emitters of the respective transistors.

The typical channel gate operates as follows: The channel counter output is normally high and supplies current to the emitter resistors 75 through the respective diode holding the emitters more positive than the base and preventing collector current flow. At the sampling time, the channel counter output falls to zero to turn on the respective transistor. Collector current then flows in accordance with base potential. The corresponding diode is back biased. The resistor in the base lead terminates a low pass filter in the channel unit (not shown). The transistor base potential is the sum of the DC bias voltage and the speech signal from the channel unit. The collector current is a pulse whose amplitude varies above or below the bias pedestal according to the instantaneous speech voltage. Clipping diodes (not shown) in the channel units prevent high level transients from driving the gates into conduction during their off time. The collector current of the 24 transistors appears in the line 73 as a time sequence of samples from the individual channels, each riding on its own pedestal. As will be presently apparent, the sampling by the channel gates is only the first step in a two-step process.

The resultant sample train on line 73 has three shortcomings. Firstly, the individual samples are not stationary in amplitude but vary within the sampling interval according to the signal in the sample channel. This variation would be intolerable at the encoder. Secondly, the sample train contains violent transients between samples which arise from the propagation delays and spurious outputs of the channel counters. Note, however, that the time of these transients is well defined. Thirdly, the sample train has a DC pedestal which must be removed if symmetric compression is to be employed. Condenser coupling eliminates the DC component, but because of the inter-sample transients, it is not true that the resultant waveform has a zero sample value at zero.

Figure 4:
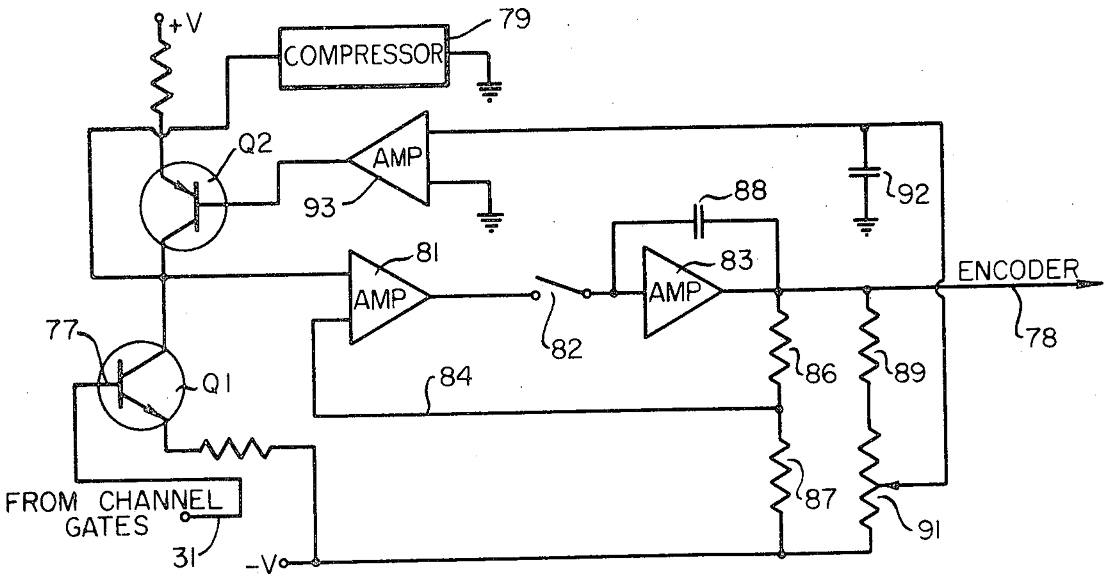
FIG. 4 is a schematic block diagram of a sample and hold circuit for use in the systems shown in FIGS. 1 and 2.
Figure 5:
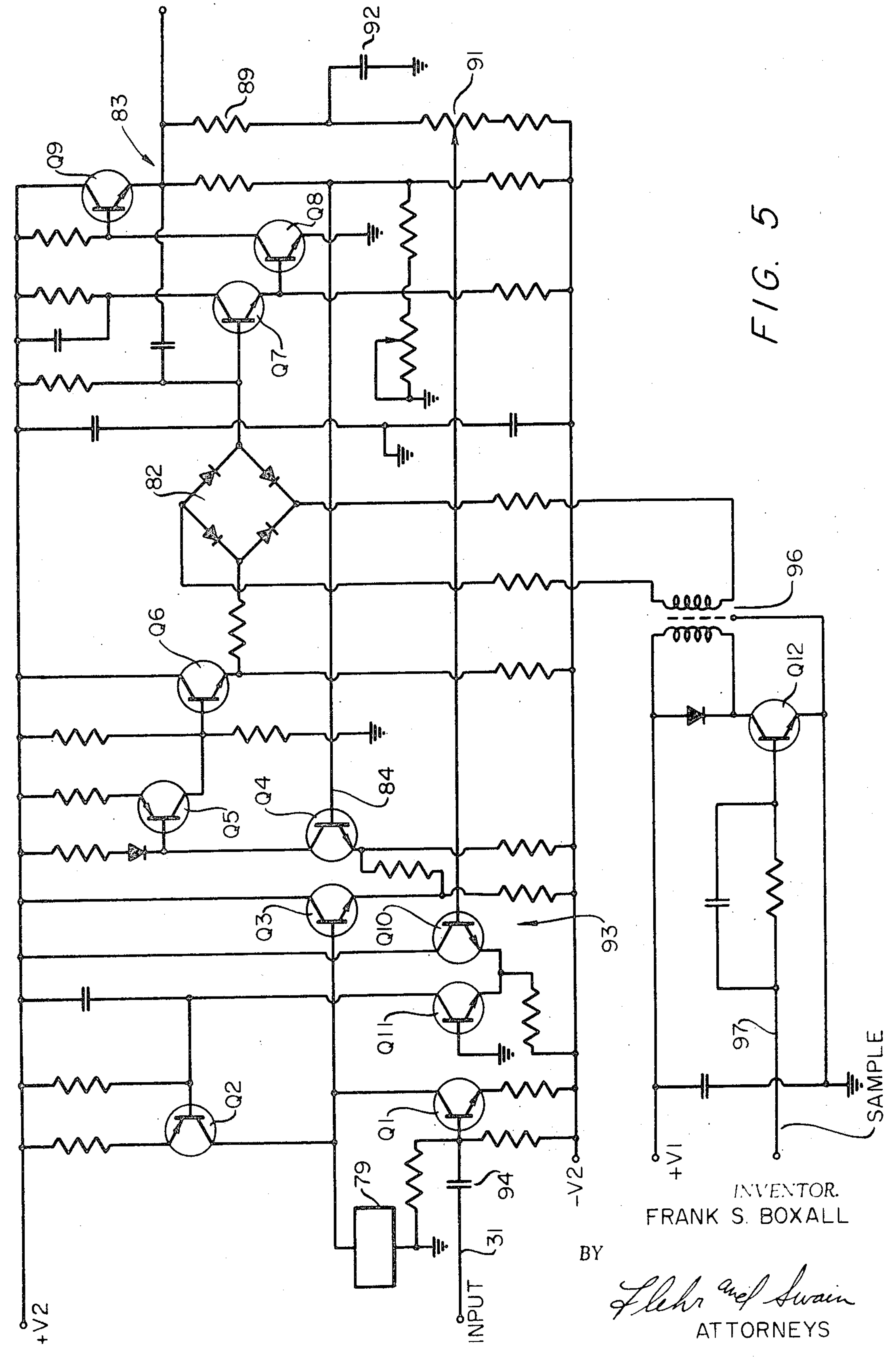
FIG. 5 is a detailed circuit diagram of the sample and hold circuit shown in FIG. 4.

The second step of the sampling process is accomplished by the circuit shown in FIGS. 4 and 5 wherein diode compression is followed by sample and hold for linear encoding. The requirement for speech compression to reduce quantizing noise is described above and is not repeated here.

Referring to FIG. 4, the signals from the channel gates are applied along line 31 to the base 77 of transistor Q1 of the sample and hold circuit. The output from the circuit is available at the line 78. Collector current from the transistor Q1 is applied to the compression circuit 79 which may include a network of diodes and resistors. Such circuits are known in the art and are described in an article entitled "A Companded Coder System for an Experimental PCM Terminal" by H. M. Straube, and C. P. Villars, Bell System Technical Journal, Vol. XLI, No. 1, January, 1962. Transistor Q2 provides a DC current which automatically centers the compressor characteristic, as will be described below. The voltage across the compressor is the input to a differential amplifier 81. During sampling, an electronic switch indicated at 82 is closed and the output of the amplifier 81 is applied to the amplifier 83. The amplifier 83 is connected to provide feedback to the amplifier 81 along the line 84 connected in the voltage divider circuit including resistors 86 and 87. Because of this feedback, when the switch 82 is closed, the amplifier 83 drives to a value which corresponds to the input voltage to the amplifier 81. The amplifier 81 is selected to have a high input impedance at balance and does not disturb the compressor 79. The amplifier 83 charges the holding capacitor 88 to the value of the compressed sample pulse applied to amplifier 81.

During coding, the switch 82 is open, the amplifier 83 holds its output because the holding capacitor 88 supplies its input. The high input impedance of the amplifier 83 prevents discharge of the holding capacitor during the coding interval. After coding, the switch 82 again closes and a new sample value is established at the output of the amplifier 83. It is not necessary to erase the holding capacitor 88 between samples because during sampling the amplifier 83 drives to the present sample pulse value regardless of the initial condition at the start of sampling.

Previous reference was made to automatic centering of the compressor characteristics. It is evident from the foregoing that the condition of the compressor is of interest only at the time that the switch 82 is closed. If the compressor is properly centered at this time, then the long-term average of the sample sequence derived from the compressor will have a zero DC component because the signals in the 24 input channels have zero DC components. On the other hand, off-center compressor characteristics would create a DC component. The sequence of samples derived from the compressor is available at the output of the amplifier 83. Strong DC filtering by the combination of sampling resistors 89, 91 and capacitor 92 yields a DC component which is compared to zero by amplifier 93. The amplified difference drives the base of the transistor Q2 which injects current into the compressor in the proper phase to reduce the difference to zero. This action ensures that the compressor is properly centered at the time that it is sampled. However, it should not be concluded that the DC voltage across the compressor is zero. This is not true and not important. What is important is that the average value of the compressor voltage as viewed through the sampling window be zero.

A detailed circuit diagram of the circuit of FIG. 4 is shown in FIG. 5. The input signal is applied along the line 31 through coupling capacitor 94 to the base of transistor Q1 which has its collector connected to the compressor 79. The transistor Q2 supplies its collector current to the compressor as previously described. The transistors Q3, Q4, Q5 and Q6 and associated circuitry form the amplifier 81 whose output is applied to diode switch 82. The diode switch is a balanced diode bridge driven from a pulse transformer 96. The output of the switch 82 is applied to amplifier 83 comprising transistors Q7, Q8 and Q9 and associated circuitry. Feedback is applied along the line 84 to the base of the transistor Q4. The automatic centering circuit includes the filtering network including resistors 89, 91 and capacitor 92 as previously described which applies a voltage to the base of the transistor Q10 which, together with transistor Q11 and associated circuitry, forms the amplifier 93. The output of the collector of transistor Q11 is applied to the base of the transistor Q2 in the manner previously described.

The pulse transformer 96 is driven by pulses having the second sampling frequency (8,000 × 24 sampling pulses/sec) applied to the base of transistor Q12 along the line 97. The collector of transistor Q12 drives the primary of the pulse transformer 96.

Figure 6:
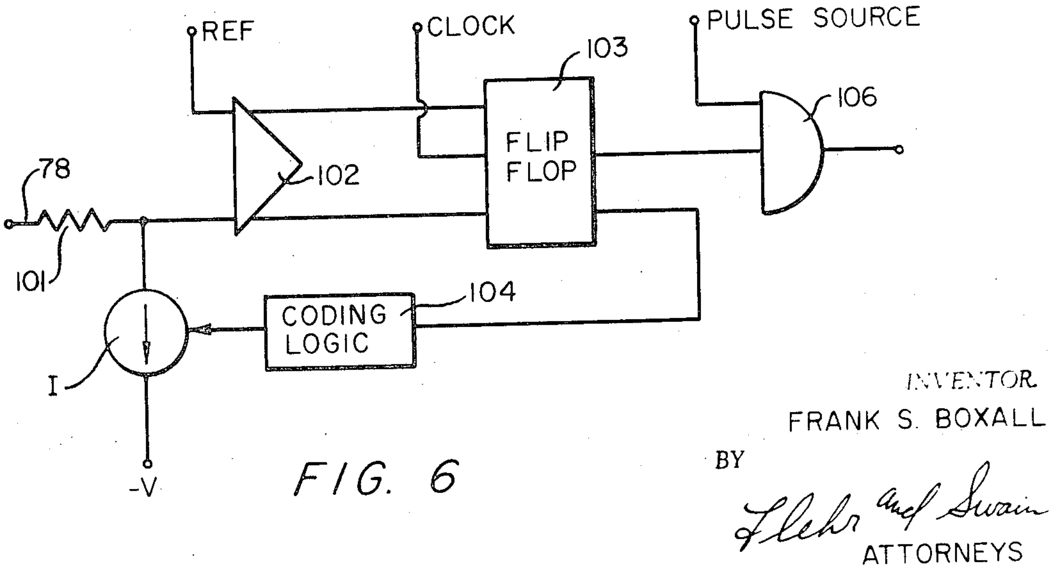
FIG. 6 is a schematic block diagram of the encoding circuit of FIG. 1.

The output from the sample and hold circuit is applied to the input terminal 78 of the encoding circuit, FIG. 6. The encoding operation in the transmitting terminal is a clocked sequence of seven binary decisions during which the sample voltage is compared to a second voltage which is adjusted step by step in binary increments towards the sample value. Referring to FIG. 6, a quantizing current I produces a voltage drop across the resistor 101. The input to differential amplifier 102 is the sample voltage less the voltage drop across the resistor 101 because of the flow of quantizing current I through the resistor. The output of the amplifier 102 limits in one polarity or the other according to whether the sample voltage is greater or less than the reference voltage drop across the resistor 101 due to the quantizing current. At each decision time, the clocked flip-flop 103 reads the amplifier polarity and instructs the coding logic 104 to alter the quantizing current in the proper direction to balance the amplifier.

The quantizing current is produced by seven parallel current sources. These are clocked on in order. The first six are clocked off according to the feedback command from the coding flip-flop. The coding flip-flop controls a pulse gate 106 which, after each coding decision, passes or blocks a pulse according to the polarity of the decision. The pulse train at the output of this gate is the seven bit code pulse group representing the quantized value of the sample.

Figure 7:
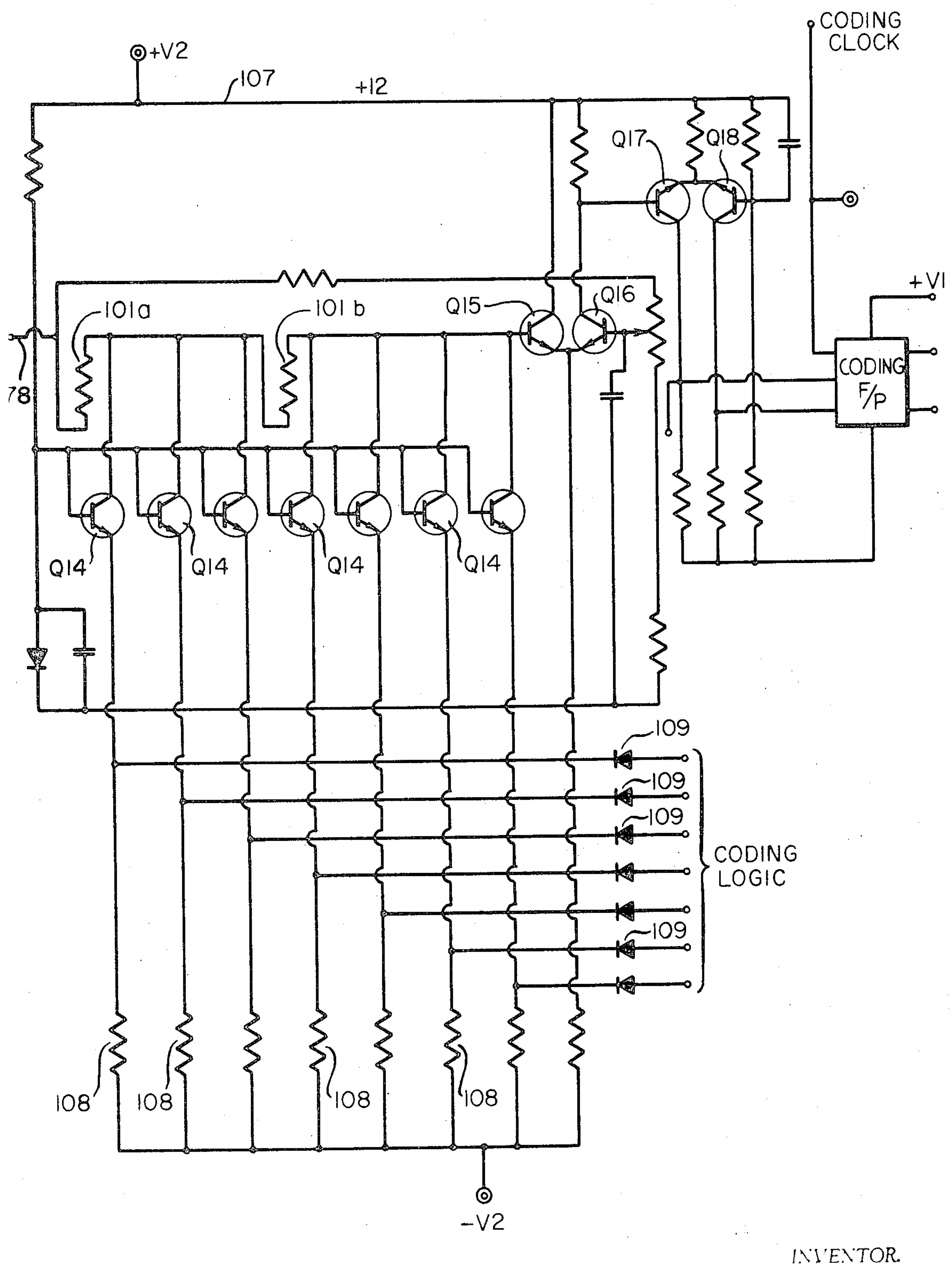
FIG. 7 is a detailed circuit diagram of the encoding circuit of FIG. 6.

A typical encoder is shown in FIG. 7 and includes seven parallel current sources which produce currents having relative weights of 4, 2, 1 and 3, 4, 2 and 1 units. These sources comprise a plurality of transistors Q14, having their bases connected to the common voltage +V2 on line 107. The collectors are connected to the input through resistors 101*a* and 101*b*. These two resistors perform the function of resistor 101, previously described. The resistor 101*b* has a value which is 15 times that of 101*a* whereby the currents referred to immediately above cause voltage drops at the input of relative weights 64, 32, 16, 8, 4, 2 and 1. Emitter resistors 108 are selected to give the currents having the predetermined relative weights, immediately above, when the respective transistor Q14 is turned on. The transistors Q14 are gated on by application of pulses through respective diode 109 to the emitters. The input voltage less the voltage drop across resistors 101*a* and 101*b* is applied to the base of transistor Q15 of the differential amplifier including transistors Q15 and Q16 and associated circuitry. A reference signal is applied to the base of the other transistor Q16. The difference signal output from the amplifier is applied to the base of transistor Q17 of another differential amplifier which includes transistors Q17 and Q18 and associated circuitry. The output of this amplifier limits in one or the other polarity, depending upon the output from the comparison amplifier including transistors Q15 and Q16. This drives the clocked flip-flop 103.

The transistors Q14 are clocked on to produce currents in the order 4, 2, 1 and 8, 4, 2 and 1. The first six are clocked off according to the feedback command of the coding flip-flop. This gives rise to the voltages of relative amplitude 64, 32, 16, 8, 4, 2 and 1. For example, if 64 is too small, the first transistor will be left on through the remainder of the coding interval; but if 64 is too large, it will be turned off at the same time that the second transistor is turned on. Thus, after the first decision, the quantizing voltage is either increased or decreased by 32 units. After the second decision, the quantizing voltage is either increased or decreased by 16 units, and so on, through six steps, so that after the sixth decision, the quantizing voltage is either increased or decreased by one unit. The seventh decision reads the final polarity of the differential amplifier, then all the currents are reset for coding of the next sample applied thereto.

Figure 8:
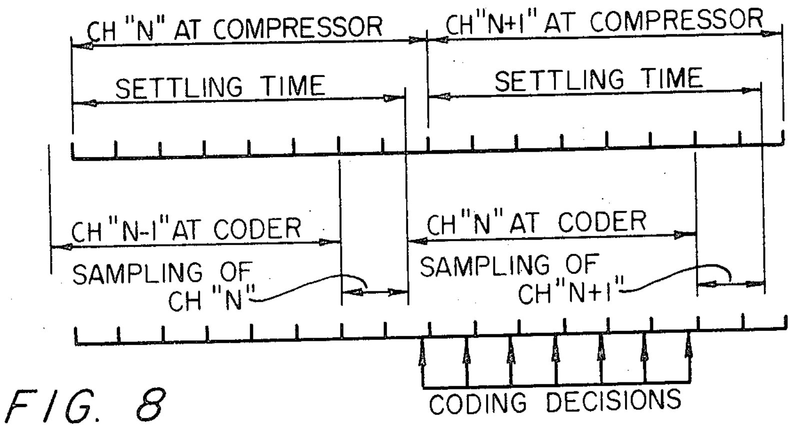
FIG. 8 is a timing diagram for the system shown in FIGS. 1–7.

FIG. 8 depicts the time relationship of the sample pulses and the coding pulses and also of the various operations. One sample from the channel gate occupies eight time slots. Sampling by the sample and hold circuit occurs near the end of this interval allowing maximum settling time of the sampled signal at the compressor. The sampling interval for the switch 82 is one and one-half time slots allowing six and one-half time slots for the bit at a time coding procedure which involves the seven binary decisions. While channel N is being encoded, channel N+1 is settling at the compressor. The inter-channel spikes occur at the beginning of the settling time and have completely disappeared before the sampling interval. In order to establish the new sample in the time available, it is necessary that amplifiers 81 and 83 have low output impedance and adequate current capacity to charge the holding capacitor, and that the feedback have a fast transient response.

During holding, the amplifier 81 must be controlled so that in limit it cannot break through the open sampling switch 82. As sampling proceeds, amplifier 81 moves from limit to balance and its impedance across the compressor changes. This change is equivalent to a transient disturbance on the input line which must decay before sampling is completed.

Figure 9:
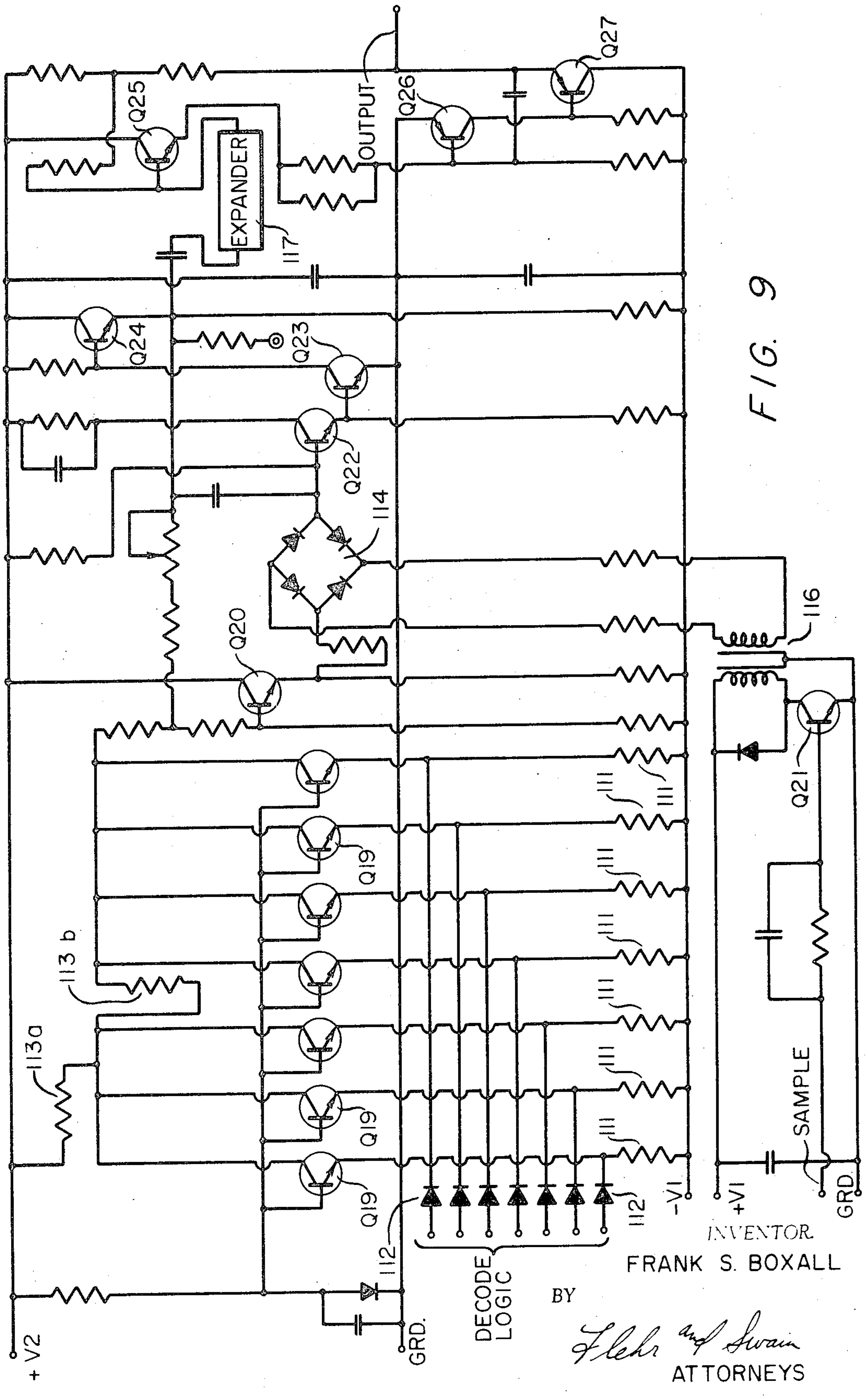
FIG. 9 is a circuit diagram of the decoding, sample and hold, and expander circuits shown in FIG. 2.
Figure 10:
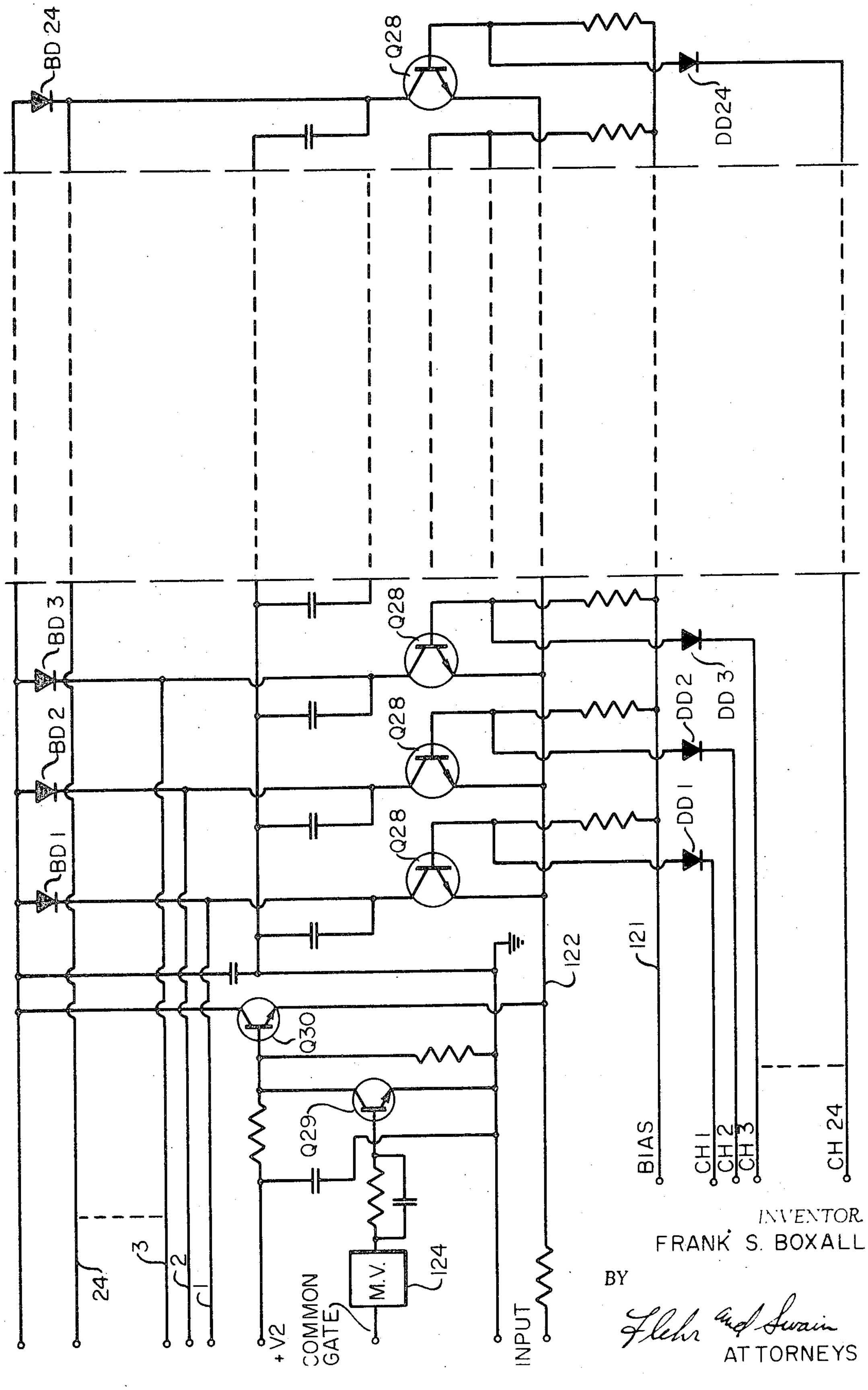
FIG. 10 is a circuit diagram showing the distribution gates shown in FIG. 2.

In FIGS. 9 and 10, there is shown a circuit diagram of the portions of the receiving terminal which processes the speech information. Referring to FIG. 9, the terminal includes a set of seven current sources of the type previously described. The current sources include the transistors Q19 and associated circuitry including the current determining resistors 111. The bases of the transistors are biased so that the transistors are off until a logic pulse is applied to the emitter of the transistors through diodes 112, at which selected ones turn fully on and conduct a current having a value 4, 2, 1 and 8, 4, 2 or 1 unit depending on the input code. The first pulse of the incoming pulse code group will, if present, turn on the first transistor; the second pulse, the second transistor, and so on. After seven pulses, the total current flowing through the transistors and through the resistors 113*a* and 113*b* gives a quantized voltage representative of the coded pulse group. This voltage is the input to sample and hold amplifiers Q20, Q22, Q23 and Q24, and diode sampling switch 114 driven from a pulse transformer 116. Similar to the encoder, the resistor 113*b* has a value 15 times that of 113*a* whereby the currents described immediately above give voltages having relative amplitudes 64, 32, 16, 8, 4, 2 and 1 units.

The pulse transformer 116 is driven by an amplifier including transistor Q21. The transformer is pulsed at the sampling rate whereby at the end of each code group the diode switch 114 closes to establish the decoded sample value at the output transistor Q24 of the amplifier including transistors Q22, Q23 and Q24. Then the diode switch opens and the decoded sample value is held for expansion and distribution while the succeeding sample is being decoded.

The PAM signal is then switched. The output of this amplifier is applied to an expander 117 which has the inverse characteristics of the compressor. The expanded pulses are proportional to the sample pulses derived at the input terminal. These pulses are applied to an amplifier including the transistors Q25, Q26 and Q27 and associated circuitry. The amplified output is then a series of 24 pulses having amplitudes corresponding to the originally sampled 24 pulses.

Referring to FIG. 10, the PAM pulses are applied to distribution gates, DG1 – DG24, which are similar to the input gates and include gating transistors Q28 and associated circuitry forming a plurality of output gates. The gates are gated by channel pulses derived from the incoming signal applied through diodes DD1 – DDD24 and distribute the pulses to the appropriate associated channel unit connected to lines 1 – 24.

The distribution gate transistors share a common base bias supply voltage on line 121. The emitters are tied to a common line 122. Collector bias voltage is supplied from the channel units through the receiving filters. The channel counter input to the bases is normally low and the base is held down through conducting diodes DD1 – DD24. At sampling time, the channel counter output rises above the bias supply, the diode is reverse biased, and collector current flows through the associated transistor and common emitter resistor.

The conducting gate has an emitter potential determined by the bias supply and all 24 emitters have this potential. The 23 other bases are all low because their channel counter outputs are low. Thus, the other 23 channel gates have reverse bias on their emitter base junctions and are held non-conducting by the one conducting gate. Withdrawing the channel unit would deprive the active gates of current and allow the inactive gates to conduct. However, in this case, diodes BD1 – BD24 become forward biased and supply the current necessary to reverse bias the inactive gate.

Imperfect timing and spurious output from the channel counter could cause a distribution gate to conduct when it should be non-conducting resulting in interchannel cross-talk. To prevent this, a blocking gate is formed by transistors Q29 and Q30 tied to the common emitter line. During the brief interval that the channel counter is advancing from one output to the next, the base of the blocking gate is driven positive well above the bias supply. This pulls up the common emitter potential and blocks all the channel gates. When the blocking gate falls back, the active channel gate conducts.

Referring to FIG. 11, the channel pulses are shown by pulse trains P1 – P24. The blocking gate pulses are shown at 123. The activated gate conducts during the interval between the gate pulses 123. Any variation in this interval would cause noise in the channels because the width of the pulses transmitted through the channel gates would vary. To overcome the effect of timing jitter in the pulses 123 which would cause this variation, a one-shot multivibrator 124 is employed to operate the blocking gate. The inter-pulse time is then the natural period of the multivibrator 124 which is determined by the constants of the circuits and do not vary. Even if the timing of the trigger pulse for the multivibrator should vary, it does not affect the inter-pulse period and because of the overlap of the pulses 123 with the pulses P1 – P24, trigger time variations will not affect the width of the pulses transmitted through the gates formed by transistors Q28.

The current through the active distribution gate is a 4 microsecond pulse whose pulse amplitude depends on the base bias and the sample voltage at the output of the common amplifier. These pulses are injected into the receiving filter in the channel unit and the filter output is the recovered speech wave.

I claim:

1. A pulse code modulation communication system for transmitting information from a plurality of channels comprising means for sequentially and periodically sampling said channels to provide a time division multiplex pulse amplitude modulated signal in which the pulses have an amplitude corresponding to the information at the time of sampling, means for receiving said pulses including compressor means, sample and hold means for periodically sampling said compressed pulses at said receiving means and for holding the same while said next channel is being sampled substantially the same components of said sample and hold means holding adjacent compressed pulses, encoding means connected to said sample and hold means to encode the pulses which are being held to provide a pulse code modulated signal and means responsive to the output of said sample and hold means for centering said compressor means.

2. A pulse code modulation communication system as in claim 1 wherein said sample and hold means comprises a first amplifier having input and output terminals, a storage capacitor connected between the input and output of said amplifier, and a switch for periodically connecting the amplifier to said receiving means to change the capacitor to a value corresponding to the pulse at the receiving means.

3. A pulse code modulation communication system for transmitting information from a plurality of channels comprising means for sequentially and periodically sampling said channels to provide a time division multiplex pulse amplitude modulated signal in which the pulses have an amplitude corresponding to the information at the time of sampling, means for receiving said pulses including compressor means, sample and hold means for periodically sampling said compressed pulses at said receiving means and for holding the same while said next channel is being sampled substantially the same components of said sample and hold means holding adjacent compressed pulses, said sample and hold means including a first amplifier having input and output terminals, a storage capacitor connected between the input and output of said first amplifier, and a switch for periodically connecting said first amplifier to said receiving means to change the capacitor to a value corresponding to the pulse at the receiving means, said receiving means including a second amplifier having input and output terminals, said input terminal connected to receive said pulses and said output terminal connected to said switch, feedback means connected between the output of the first amplifier and the input of the second amplifier, and encoding means connected to said sample and hold means to encode the pulses which are being held to provide a pulse code modulated signal.

4. A pulse code modulation communication system as in claim 1 wherein said sample and hold means includes a first amplifier and where said centering means includes a differential amplifier connected to the output of the first amplifier and serving to compare said output with a reference signal and serving to apply a voltage to said compressor means to center the same.

5. A pulse code modulation communication system for transmitting information from a plurality of channels comprising means for sequentially and periodically sampling said channels to provide a time division multiplex pulse amplitude modulated signal in which the pulses have an amplitude corresponding to the information at the time of sampling, means for receiving said pulses including compressor means, sample and hold means for periodically sampling said compressed pulses at said receiving means and for holding the same while said next channel is being sampled substantially the same components of said sample and hold means holding adjacent compressed pulses, and encoding means connected to said sample and hold means to encode the pulses which are being held to provide a pulse code modulated signal, said encoding means comprising a plurality of current sources arranged in first and second groups, the first of said groups serving to control the current through a first resistor to thereby give a voltage drop corresponding to the current drawn by the current sources of the first group, and the second group serving to draw current through a second resistor to thereby provide a voltage drop corresponding to the current through said second resistor whereby the range of current for a given number of voltage steps is minimized.

6. A pulse code modulation communication system as in claim 1 together with means for receiving said pulse code modulated signal and to decode the same to provide a time division multiplex pulse amplitude modulated signal, means for receiving said pulse amplitude modulated signal, switching means for sampling said receiving means to sample individual pulses and apply the same to a plurality of output gates, and means including gates for providing output signals corresponding to said input information.

7. A pulse code modulation communication system as in claim 6 wherein said means including gates includes a blocking gate serving to block said gates whereby said gates can only conduct when said blocking gate is active, and a multivibrator serving to control the active period of said blocking gate.

8. A pulse code modulation communication system for receiving pulse code modulated information comprising, means for decoding said information to provide a time division multiplex pulse amplitude modulated signal, means for receiving said pulse amplitude modulated signal, sample and hold means for periodically sampling said signal for holding the same for application to a plurality of output gates while succeeding pulse code modulated information is being decoded substantially the same components of said decoding means and sample and hold means decoding and holding adjacent information and signals respectively, and means including gates for providing output signals corresponding to said input information.

9. A pulse code modulation communication system as in claim 8 wherein said means including gates includes a blocking gate serving to block said gates whereby said gates can only conduct when said blocking gate is active, and a monostable multivibrator serving to control the active period of said blocking gate.

10. A pulse code modulation communication system for receiving pulse code modulated information comprising, means for decoding said information to provide a time division multiplex pulse amplitude modulated signal, said decoding means comprising a plurality of current sources arranged in first and second groups, the first of said groups serving to control the current through a first resistor to thereby give a voltage drop corresponding to the current drawn by the current sources of the first group, and the second group serving to draw current through a second resistor to thereby provide a voltage drop corresponding to the current through said second resistor whereby the range of current for a given number of voltage steps is minimized, means for receiving said pulse amplitude modulated signal, sample and hold means for periodically sampling said signal for holding the same for application to a plurality of output gates while succeeding pulse code modulated information is being decoded substantially the same components of said decoding means and sample and hold means decoding and holding adjacent information and signals respectively, and means including gates for providing output signals corresponding to said input information.

* * * * *